Aug. 19, 1930.  J. CANNING  1,773,388
STONE SURFACING MACHINE
Filed Aug. 18, 1923   4 Sheets-Sheet 3
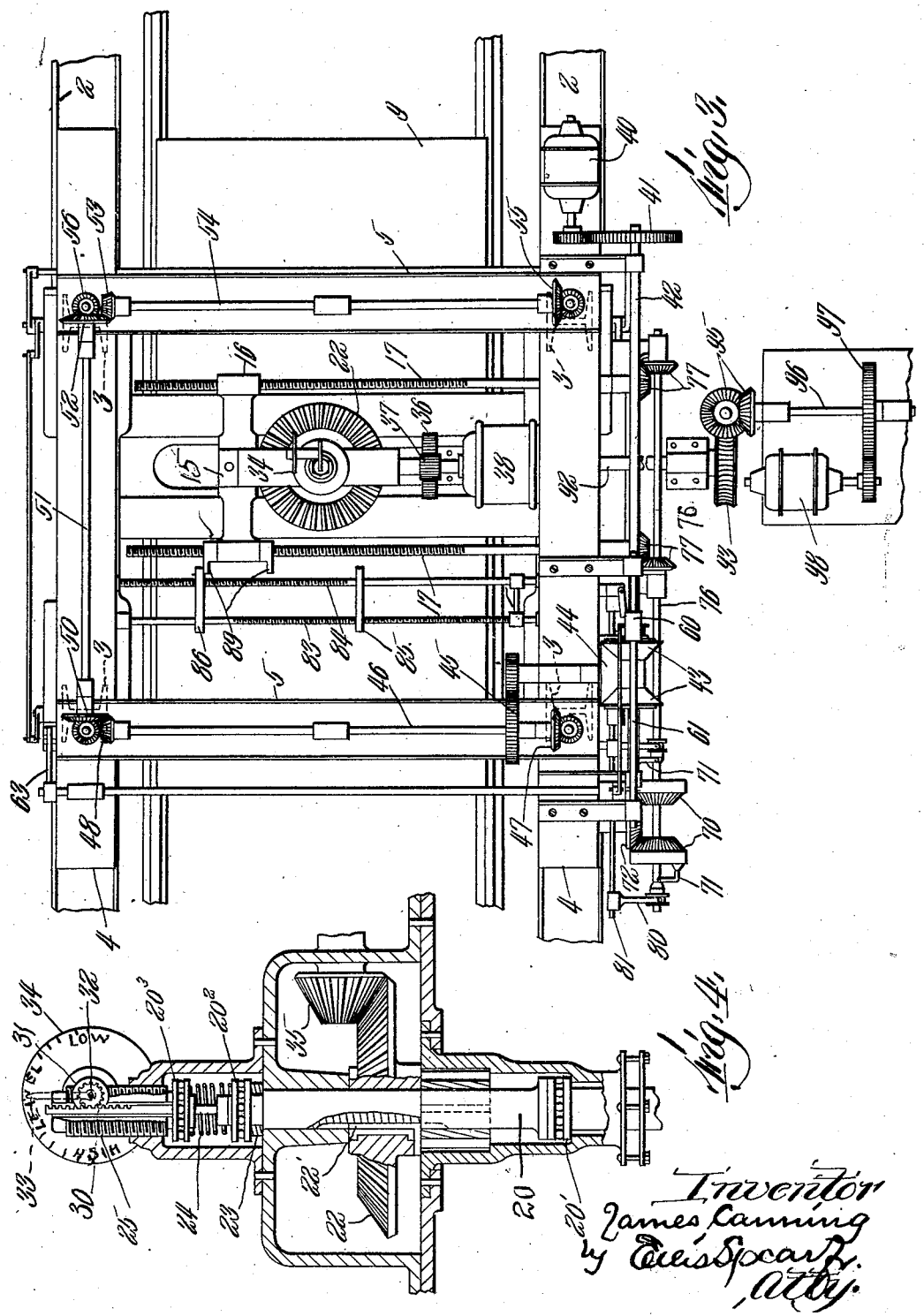

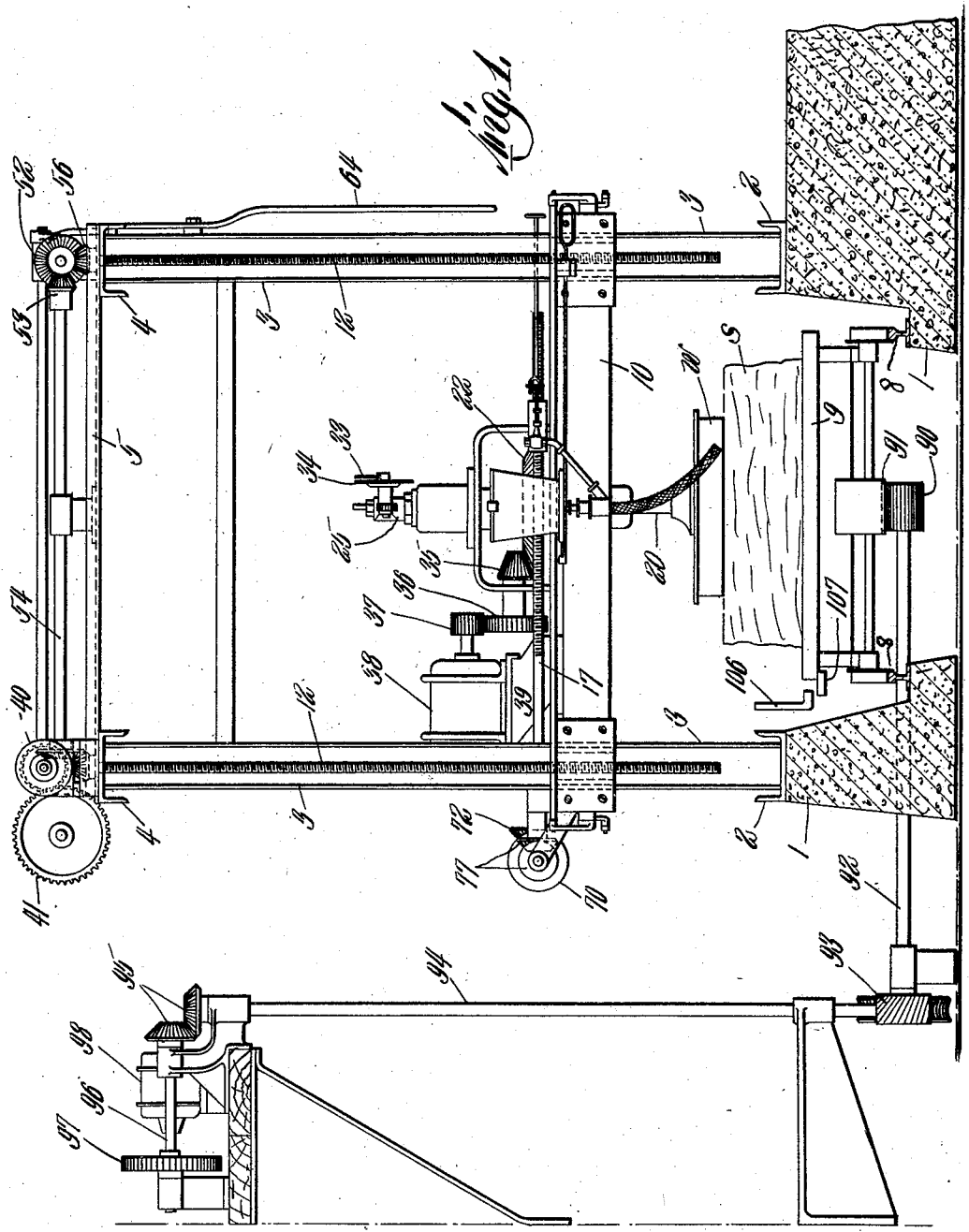

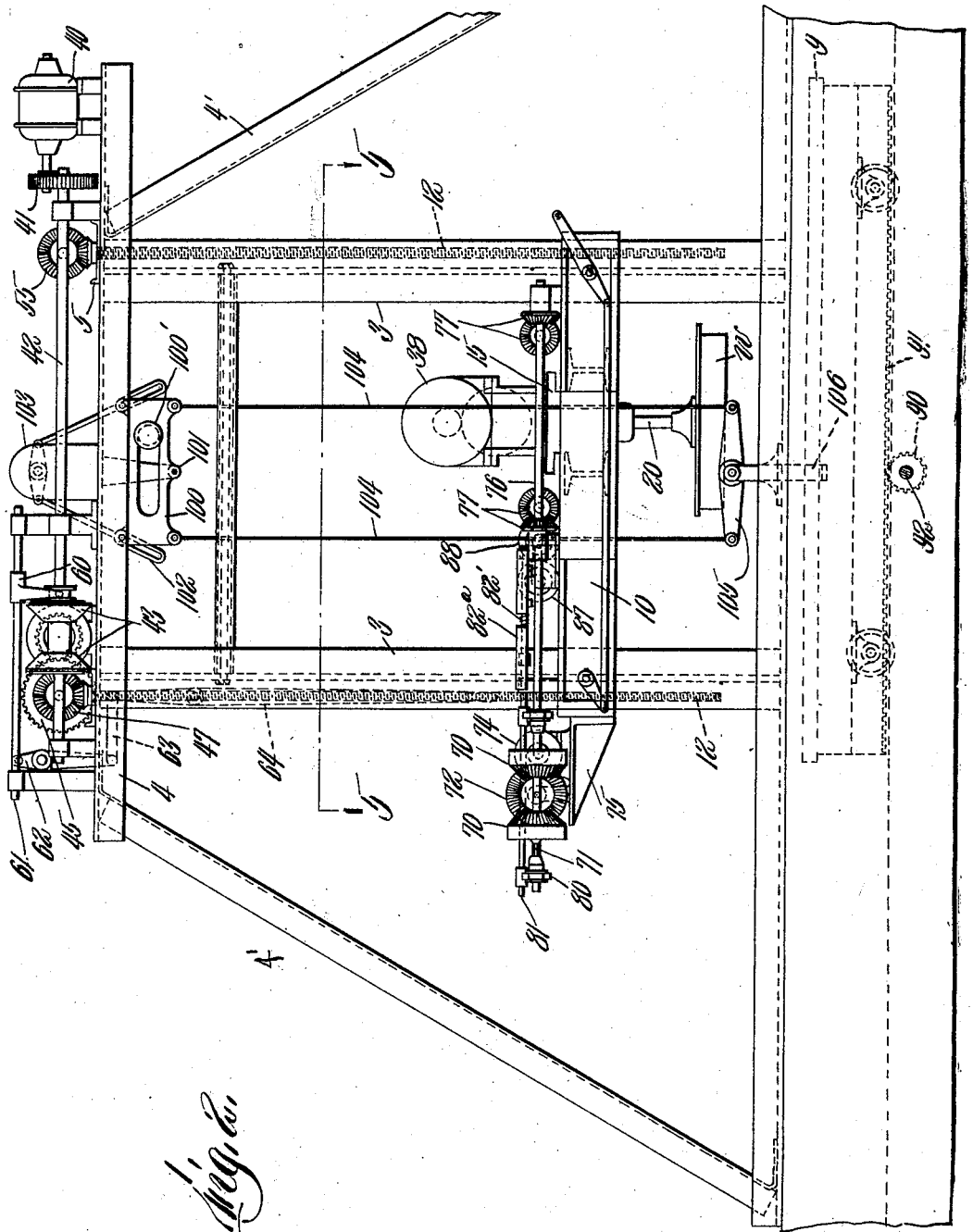

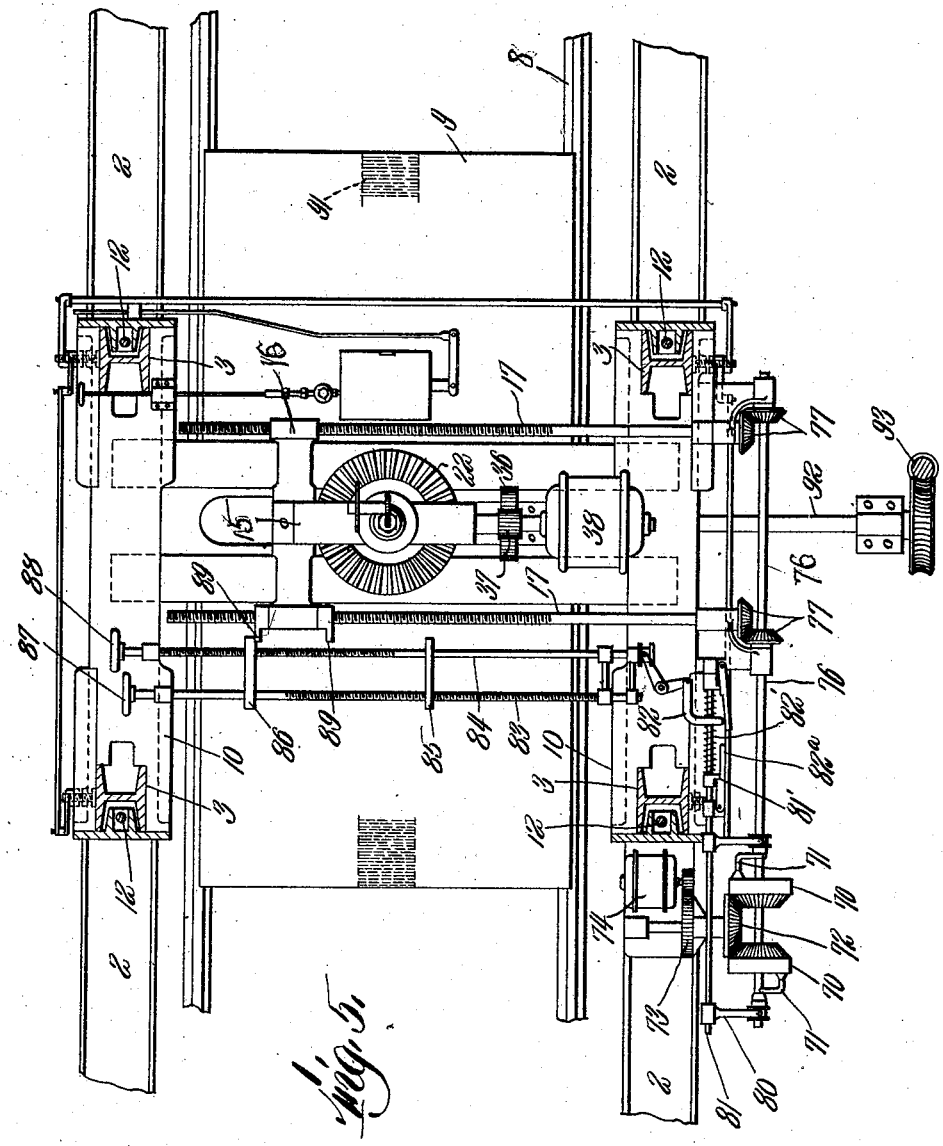

Patented Aug. 19, 1930

1,773,388

UNITED STATES PATENT OFFICE

JAMES CANNING, OF MONTPELIER, VERMONT

STONE-SURFACING MACHINE

Application filed August 18, 1923. Serial No. 658,025.

An understanding of my present invention involves the consideration of the art of stone facing and polishing, particularly with reference to the harder stones such as granite and the like. Blocks of such material, by reason of its grain or texture, are of necessity usually somewhat rough and on account of hardness the reduction of any face to a perfect surface is one of considerable difficulty.

One of the difficulties of more rapid reduction of uneven stone surfaces to a smooth and uniform plane lay in the obvious fact that as the speed of the cutting away increased, the danger of overcutting likewise increased.

My invention contemplates a rapid rate of cutting by means largely under mechanical control and yet so devised as to make it possible for the operator to keep his controls so regulated that he is able to avoid overcutting in any one place. He is also at the same time able to so distribute and relate the continuous and progressing cutting and more rapidly bring the whole to an absolute and uniform surface in a true plane which plane is developed and becomes apparent progressively as the work proceeds and is established and verified when movement of the work is finished.

In disclosing my invention I have shown a machine of what may be called a rigid type and of single spindle as best illustrating the problem involved and the manner of its solution. The rigid type of machine is highly desirable as affording a basis for the more rapid and aggressive attack on the stone. The single spindle or single wheel is also for many reasons of greater economy and efficiency than gangs or series of spindles or cutters whose working path must overlap if ridges are to be avoided, and yet whose very overlapping tends to create inequality.

The problem of the single wheel is one of traverse, ample to provide for the covering of every portion of the face of the stone but it is complicated by the problem of such a regulation as will permit repeated traversings or even dwells at high areas with an avoidance of such at lower areas.

It is furthermore to be noted that in the reduction of a rough or uneven surface to a true plane capable of taking a high polish that any overworking must not only be avoided but must be anticipated while at the same time the underworking of high spots must be also anticipated in order to avoid an increase in difference in the level and in exaggeration of contrasted areas.

Solution of this problem has been variously attempted but so far as I am advised without complete success. One of the most important factors of the success of my invention lies in the combination with the traversing means of a single rigid work spindle of compressible means for maintaining the spindle against the work, including means for continuously observing indicated relative states of the perpendicular positioning of the work spindle whereby the successive working plane of the surfacing wheel in its traverse of the stone may be compared. This means of comparison may be of somewhat varied character and may include various functions, but its important and fundamental character lies in its relation to the control of the traverse by which the wheel may be brought to any spot in the stone and returned or held there or quickly removed from that area with continued reference to other but particularly the adjacent areas.

All this will be more clearly understood by reference to the machine selected as illustrative of my invention and which I have shown in the accompanying drawings.

For the purposes of my present application there is illustrated in the drawings forming a part hereof a machine in accordance with my invention and capable of performing work in accordance with the requirements and desires heretofore pointed out. Throughout the specification and drawings like reference characters are employed to indicate corresponding parts, and in the drawings:

Fig. 1 is an end elevation of the said machine.

Fig. 2 is a rear view with truck drive not shown.

Fig. 3 a plan view.

Fig. 4 a sectional view of the spindle head, and

Fig. 5 a plan section along the line a—a, Fig. 2.

In such a machine suitable foundation is provided as at 1 to which channel beams 2 are secured to carry the main frame of the machine. This consists of vertical I-columns 3 on which is adjustably mounted a head carriage 10 in which is rigidly supported a work spindle 20 but vertically movable with reference to said carriage. The carriage 10 is vertically adjusted by the screws 12 so as to be raised and lowered with reference to a stone S on a car 9 on a trackway 8. The trackway 8 is carefully laid and leveled so that the car may be moved to carry the stone S beneath the wheel or other surfacing device W which is supported by the spindle 20, so that in all positions of the stone and the wheel there may be maintained a uniformity of level.

The spindle 20 is carried in a slide 15 which is traversed across the head carriage 10 by feed screws 17 with which the slide is engaged by threaded bearings 16 so that the head carrying with it the spindle 20 may be moved transversely of the work, which movement coupled with the longitudinal movement of the car makes it possible to cover with a single wheel the entire surface of the work and all the while working to the constant plane or surface desired.

As the face of the stone S is worked down to its ultimate surface or desired level the single wheel W in its course of travel as hereinbefore pointed out, if under automatic control will pass areas of the level or substantial level and unworked or partially worked areas of different level. The controls by which the transit of the work spindle may be checked or its traverse repeated will be pointed out hereafter but their prime importance is in relation to the connection of my spindle construction and operation, as may best be seen in Fig. 4.

The spindle 20 is carried in bearings 20' so as to be held rigidly perpendicular but freely rotatable so as to be driven by its beveled gear 22 which is splined at 22' to it to permit a slight vertical play. The upper bearing $20^2$ of the spindle rests on a thrust collar 23 bearing on a shoulder on the spindle itself. Between the bearing $20^2$ and a third bearing $20^3$ is a strong spring 24, the bearing $20^3$ is backed up by a hollow threaded plug 25 within which a rack bar 30 is movably held, the lower end of this rack bar resting on the upper end of the spindle 20 so as to follow the movements thereof. Meshing with the rack bar 30 is a small pinion 31 on the shaft 32 on which is a pointer 33 and movable with reference to a dial 34. The dial 34 is only by convenience a dial and only by convenience an indicator of anything except change of plane of the working face of the wheel W. It may be and preferably is graduated in some standard scale but its primary and important function which should be maintained is either that of verification or of indication with reference to an accomplished plane such as a finished area of surface or an unattained plane located in an unfinished or incomplete area of surface. This important potentiality and the combinations which go to make up this drive and control of the spindle will be further discussed under the operation of the machine.

The machine is preferably of the independent motor drive type, the work spindle 20 being driven through its bevel gear 22 by a gear 35 which is driven through the gear train 36—37 by the motor 38 which is supported on a bracket 39 on the head slide 15 on which the spindle head is supported.

Carried at the top of the columns 3 are a pair of frames 4 preferably braced as at 4' in the channel base 2 of the main frame and connected across by frame pieces 5 to insure the rigidity of the whole. Carried at one end of one of frame pieces 4 is a motor 40 geared as at 41 to a shaft 42 on which is splined a pair of cone pulleys 43 driving through a friction cone 44 and intermediate gearing 45. The cross shaft 46 has at one end a bevel gear 47 and at the other end a bevel gear 48. The gear 48 meshes with a gear 50 on another counter shaft 51 having at its other end a pinion 52. This in turn meshes with a bevel gear 53 on another counter shaft 54 carrying bevel pinion 55. The bevel pinions 47, 50, 52 and 55 mesh with gears 56, each at the top of one of the vertical threaded controls 12 by which the head 10 is raised and lowered.

The traversing cones 43 are shifted by a fork 60 on a shifting slide 61 rocked by a lever 62 connected by a link 63 to a hand lever 64. This provides for the reversal of the vertical feed screws 12 and the hand control of the same. The traversing movement of the spindle head carriage which is moved by the screws 17 is effected by a pair of gears 70 each having a clutch 71 and alternately driven through a pinion 72 and train of gears 73 from a motor 74 mounted on a bracket 75 carried at one side of the carriage 10. These gears 70 alternately drive the shaft 76 from which through the bevel pinions 77 the feed screws 17 are driven. The clutches 71 are controlled by forks 80 on a shift rod 81 and operated by a bell crank 82 moved by a pair of rods 83—84 on which are mounted stops 85 and 86 which may be adjusted by the hand wheels 87 and 88 so as to space the stops 85 and 86 and thus control the length of traverse of the spindle slide. On the spindle slide are stops 89 adapted to contact the stops 85 and 86 at each end of the traverse so as to engage and disengage the bevel gears 70 and reverse the drive of the shaft 76.

The clutches 71 are alternately locked in engagement by the following mechanism. On the shaft 81 are a pair of adjustable collars 81' between which and the end of the bell crank 82 are interposed a pair of cushioning springs 82'. A pair of pivoted latches 82$^a$ are provided, the ends of which are alternately tripped by the end of the bell crank 82. The bell crank 82 first compresses its opposing spring until its end has freed the latch 82$^a$ which is holding its opposing collar 81'. As soon as the latch is kicked off the rod 81 is urged forward until the following collar 81' comes behind its own latch 82$^a$ and the rod 81 is thereby held to maintain the proper clutch in engagement with its gear 70.

The car 9 may be moved along its trackway 8 by a pinion 90 engaging with a rack 91 carried on the car. The pinion 90 is on a shaft 92 and spirally geared as at 93 to a vertical shaft 94. At its upper end the shaft 94 is driven by a pair of bevel pinions 95 from a counter shaft 96 which through a train of gears 97 is driven by the motor 98. This motor therefore supplies the power by which the car is positioned or made to traverse beneath the spindle. It is reversible by a rocker 100 hung on a bracket 101 connected by links 102 to a reversing rheostat 103 which is connected up in the circuit of the motor 98 (wiring not shown). The rocker 100 is connected by rods 104 to a lower rocker 105 which has a tail lever 106 adapted to contact with the adjustable tripper 107 carried by the car whereby at the completion of a predetermined movement of the car it will be reversed. The rocker 100 is held in either of its actuated positions by a gravity roller 100' which finds lodgment in either end of its retaining slot until the rocker is brought past the level by the return trip.

In operating the machine the car 9 with a stone to be finished suitably bedded thereon is run on to the trackway 8 until its rack 91 is engaged by the pinion 90. The car may be then brought under power from the motor 98 under hand control of the rheostat 103 until it is suitably positioned beneath the wheel W. The pressure of the spring 24 is then adjusted according to the character of the work and the spindle frame 10 lowered under the control of the lever 64 until the wheel is contacting with the surface of the stone under the pressure of the spring 24 which is slightly compressed by the lowering of the head 10. This pressure depends on the character of the work and something upon the judgment of the operator and is not necessarily any arbitrary or definite amount but in the first instance is indicative of an amount of pressure adjudged to be suitable for the attack upon the rough surface of the stone. As the initial surface of the stone is hardly ever level this pressure will be a somewhat varying one and will approach zero as the spindle finds areas originally lower or areas lowered by the action of the wheel. Observation of the indicator therefore enables the operator in the changing positions of the spindle as it is traversed across the work or as the work traverses beneath it or as it takes on any combination of these movements to determine whether he is on a relatively higher or lower area. He will thus ultimately locate without the necessity of any sighting or measuring his high spots and his low spots as well as his intermediate areas and by controlling the strokes of the traverse or by causing a dwell he can rapidly bring his stone down to a true level which he can verify as he proceeds. If the work of an operator is to be inspected or checked, pressure may be relieved and the wheel made to traverse all parts of the stone, the indicator showing at all times whether or not there is variation in the surface.

My machine therefore not only eliminated the necessity of skilled mechanical manipulation but reduces the difficulties and delays of accuracy and brings the stone to the proper surface and thus correspondingly reduces the time required. Except as specifically claimed the structural details and arrangements of elements of my machine may be modified without departing from the spirit of my invention.

What I therefore claim and desire to secure by Letters Patent is:—

1. A stone surfacing machine comprising a way, a car movable along said way, a rack beneath said car, a pinion in the way and engageable therewith, a reversible drive for said pinion, a rigid frame across said way, a carriage supported on said frame and movable vertically thereof, vertical drives for raising and lowering said carriage, a cross slide on said carriage and movable transversely of said way, a reversible drive for said slide, a vertical rigid spindle bearing on said slide, a rotatable spindle vertically movable therein, a rigidly connected work wheel carried by said spindle, a spring pressed follower for said spindle, and a multiplying indicator connected to said spindle to register successive stages of vertical movement of the spindle and work wheel.

2. In a stone surfacing machine, a stone support, a rigid frame above the support, a carriage mounted on the frame and movable vertically thereof, means for adjusting vertical movement of the carriage, a cross slide on the carriage and movable transversely of the support, a work wheel rotatably supported in the slide, means for presenting the face of the work wheel in a given plane, means on the cross slide for yieldingly pressing the wheel into engagement with the stone, a stop limiting the downward yielding movement of the wheel and an indicator cooperating with the wheel effective during operation of the wheel and intermediate the limits of the yielding movement of the wheel to indicate when the surface of the stone being operated upon is at a predetermined level.

3. In a stone surfacing machine, a stone support, a rigid frame thereabove, a work wheel rotatably supported in said rigid frame, said wheel support being so arranged as to constantly maintain the face of the wheel in a horizontal plane adjusting means mounted on the frame adapted to move the wheel to different horizontal positions relative to the stone being operated upon, means for varying the vertical adjustment of the wheel upon the frame, and supplemental vertically adjusting means permitting vertical movement of the work wheel independently of said first-named vertical adjustment, said supplemental adjusting means including a yielding resilient member effective to press the face of the work wheel into engagement with the stone operated upon and permitting slight vertical movement of the wheel independently of the first-named vertical adjustment, and means cooperating with the resilient member whereby said last-named means may function as a stop or base line to positively arrest the downward movement of the work wheel and thus prevent the functioning of the wheel below a predetermined level, which level may be varied and determined by said first-named vertical adjusting means.

4. In a stone surfacing machine, a stone support, a rigid frame thereabove, a work wheel rotatably supported in said rigid frame, said wheel support being so arranged as to constantly maintain the face of the wheel in a horizontal plane, adjusting means mounted on the frame adapted to move the wheel to different horizontal positions relative to the stone being operated upon, means for varying the vertical adjustment of the wheel upon the frame, and supplemental vertically adjusting means permitting vertical movement of the work wheel independently of said first-named vertical adjustment, said supplemental adjusting means including a yielding resilient member effective to press the face of the work wheel into engagement with the stone being operated upon and permitting slight vertical movement of the wheel independently of the first-named vertical adjustment, and an indicating means responsive during the operation of the wheel, and while the resilient member is effective, to indicate when the working face of the wheel is at a predetermined or given level.

5. A stone surfacing machine, comprising a carriage support, a carriage movable vertically thereof, a cross slide on said carriage, a reversing drive for said slide, adjustable stops adapted to be successively contacted by said cross slide and effective upon such contact to automatically reverse the direction of slide drive, a dominant hand control for said stops effective upon actuation to render said stops ineffective to reverse said slide, a vertical spindle bearing on said slide, a rotatable spindle vertically movable in said bearing, a work wheel carried by said spindle, and means for continuously indicating successive states of perpendicular adjustment of said wheel relative to the ultimate predetermined surface level of the stone being worked upon.

6. In a stone surfacing machine, a frame, a carriage adjustable thereon, a cross-slide supported by said carriage, a work wheel supported on said slide, and a reversible drive for said slide comprising a motor, a shaft having a pair of clutches and driven from said motor, alternately effective slide operating devices driven from said clutch shaft, a clutch shifting rod, a bell crank lever for operating said rod, and a pair of hand-operated control rods connected to said bell crank and provided with adjustable stops disposable in the path of said slide for limiting the extreme traverse thereof in either direction.

7. In a stone surfacing machine, a frame, a carriage adjustable thereon, a cross-slide supported by said carriage, a work wheel supported on said slide, and a reversible drive for said slide comprising a motor, a shaft having a pair of clutches and driven from said motor, alternately effective slide operating devices driven from said clutch shaft, a clutch shifting rod, a pair of adjustable spring-controlled collars on said rod, a pair of latches cooperative with said collars, a bell crank lever for alternately tripping said latches, and a pair of hand-operated control rods connected to said bell crank lever and provided with adjustable stops disposable in the path of said slide for limiting the extreme traverse thereof in either direction.

8. In a stone surfacing machine, a way, a car movable along said way, a reversible drive for said car, a frame across said way, a carriage adjustable vertically of said frame, raising and lowering screws for effecting said adjustment, a reversible drive for said screws and independent of said drive for said car, a cross slide on said carriage, a reversible drive for said slide independent of said drives for the car and screws and including a pair of adjustable stops adapted alternately to be contacted by said slide to accomplish the reversal thereof and a dominant hand control for said stops, a work wheel depending from said slide, and a constant drive for said work wheel independent of the reversible drives for said car, screws, and cross slide.

9. In a stone surfacing machine, a frame, a work wheel carriage adjustable vertically thereon, a series of raising and lowering screws for effecting adjustment of said carriage, gears at the upper ends of said screws, a driving shaft, a shaft driven therefrom, reversible driving connections between said shafts, including a pair of cone pulleys on said motor driven shaft and a friction cone cooperative therewith, driving connections from said driven shaft to said screws, and a control for reversing the direction of rotation of said screws including a shifting slide having a fork cooperative with said cones, and a hand lever operatively connected with said slide.

In testimony whereof I affix my signature.

JAMES CANNING.